United States Patent [19]
Huffman et al.

[11] 3,937,100
[45] Feb. 10, 1976

[54] TRANSMISSION SHIFT CONTROL

[75] Inventors: Dale F. Huffman, Muncie; Charles E. Zeh, Chesterfield, both of Ind.

[73] Assignee: Borg-Warner Corporation, Chicago, Ill.

[22] Filed: Aug. 15, 1974

[21] Appl. No.: 497,815

[52] U.S. Cl. .................................................. 74/476
[51] Int. Cl.² ...................... G05G 5/02; G05G 9/14
[58] Field of Search ....................................... 74/476

[56] References Cited
UNITED STATES PATENTS

| | | | |
|---|---|---|---|
| 1,948,723 | 2/1934 | Lapsley | 74/476 X |
| 3,192,793 | 7/1965 | Hurst, Jr. et al. | 74/476 |
| 3,323,387 | 6/1967 | Hurst, Jr. et al. | 74/476 |
| 3,786,690 | 1/1974 | Bruhn, Jr. | 74/476 |
| 3,793,901 | 2/1974 | Muller et al. | 74/476 X |
| 3,866,488 | 2/1975 | Nakata et al. | 74/476 X |

FOREIGN PATENTS OR APPLICATIONS

530,854  8/1931  Germany ........................ 74/476

Primary Examiner—Allan D. Herrmann
Attorney, Agent, or Firm—Julian Schachner

[57] ABSTRACT

A transmission shift control mechanism for preventing inadvertent movement toward the reverse gear engaging position during forward upshifting or downshifting, thereby reducing the forward shift time and thus reducing harmful engine emissions. The shift lever is guided in its movement between shift rails, and blocked from moving to the reverse shift rail engaging position until an additional movement is made. Shift rail collars define shift lever guides, the reverse one of which is offset from the forward guides to thereby require the additional movement of the shift lever.

6 Claims, 5 Drawing Figures

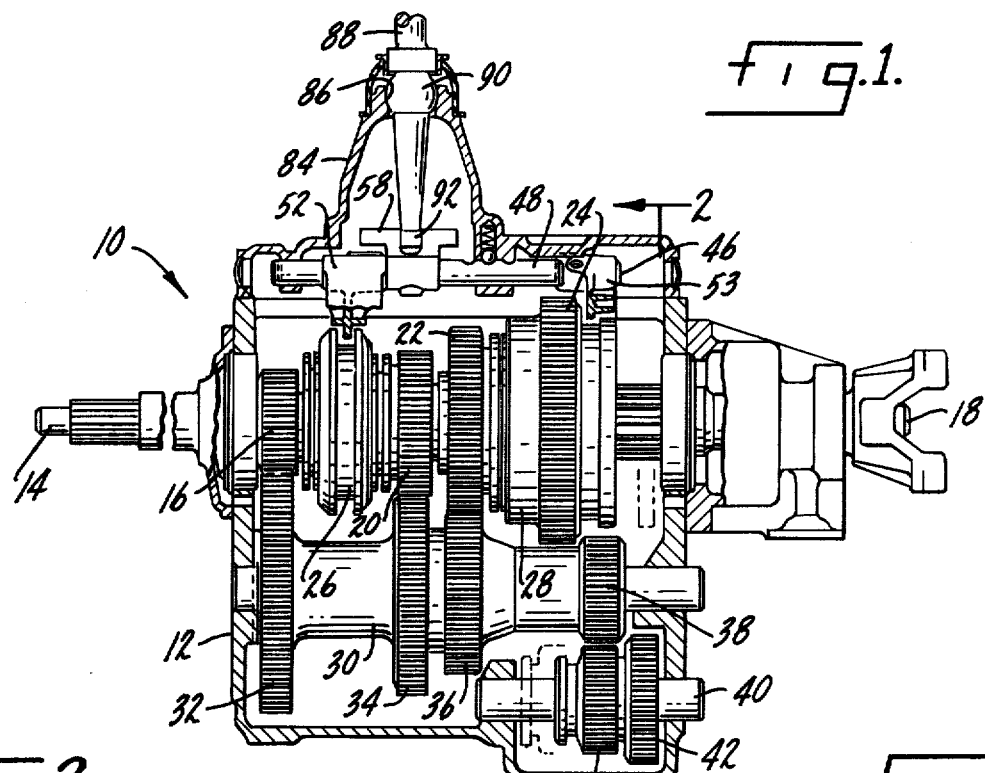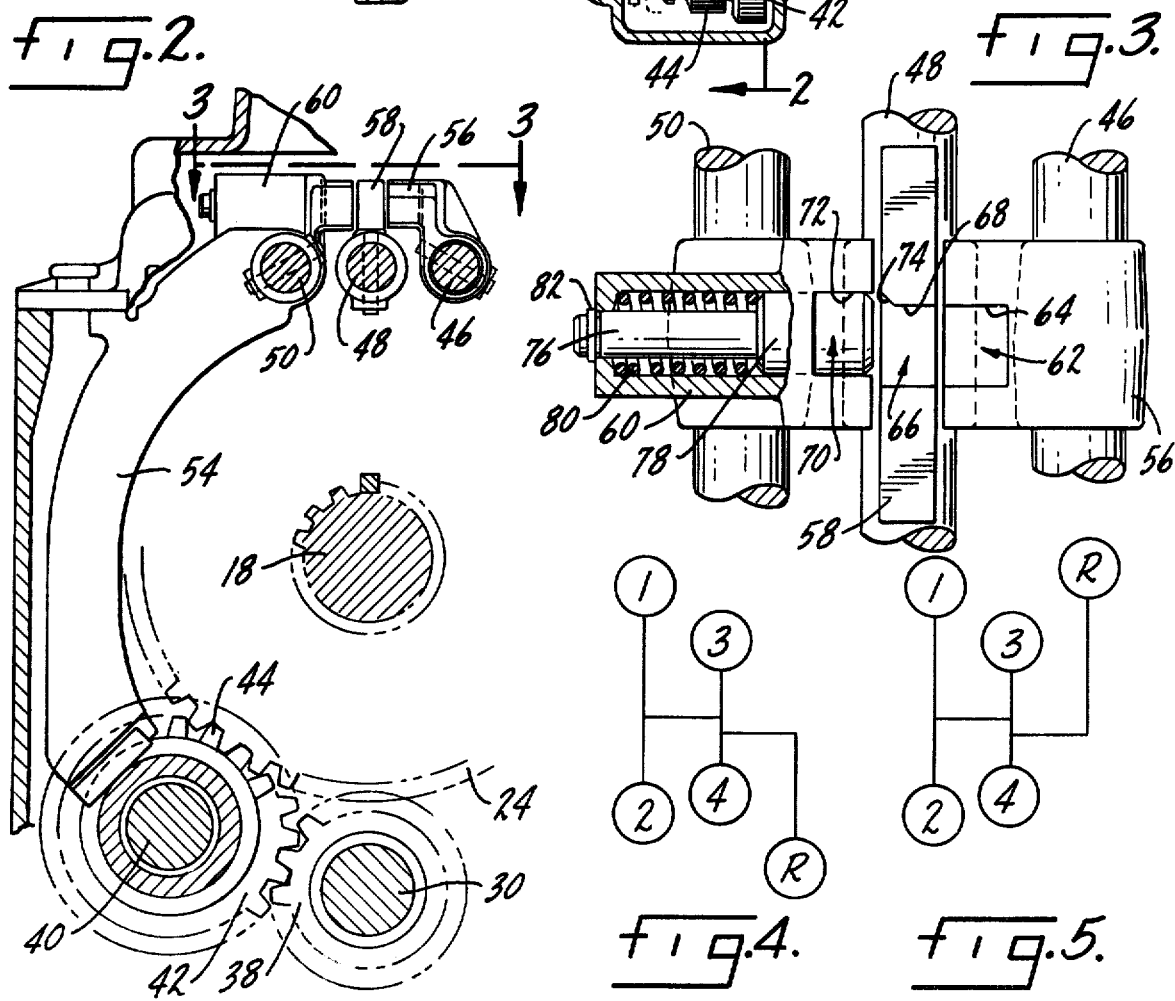

3,937,100

TRANSMISSION SHIFT CONTROL

BACKGROUND OF THE INVENTION

1. Field of the Invention

This invention relates generally to automotive transmissions or the like and more particularly to the controlled shifting of such a transmission in a manner tending to prevent inadvertent shifting into reverse gear and reducing the time required to shift through the forward gears.

2. Description of the Prior Art

In recent years there have been many improvements in automotive transmissions, including improvements related to the shifting of sliding gear manual transmissions. These improvements have involved rather complex structural controls, and in some instances have involved additional shift lever control elements. There remains a need to provide a simplified shift control system for establishing a desirable shifting pattern and preventing inadvertent shifting toward reverse gear during shift control movement through forward gears.

Accordingly, it is an object of this invention to meet the continuing need and desire in the art for improvements in transmissions and transmission controls by providing, for example, a multiple speed sliding gear manual transmission shift control which successfully prevents inadvertent shifting into reverse gear while at the same time incorporates economical shift elements which exhibit reliability in service.

SUMMARY OF THE INVENTION

The invention is directed to an improved shift control system for a sliding gear manual transmission wherein a shift lever is moved to engage a shift rail, and thereafter is moved to carry the engaged shift rail and its associated synchronizing clutch mechanism to a position engaging a selected gear. Generally, the first movement to engage a shift rail is such that a portion of the shift lever moves into a gate provided in a collar on the shift lever. In a multiple speed sliding gear transmission there is generally provided a plurality of shift rails and associated collars, each collar having a gate.

The invention is directed to the orientation of these gates. In particular, the gate associated with the reverse shift rail is offset from the gates associated with the shift rails controlling forward drive gears, such that movement of the shift lever into the reverse gate is blocked until the shift lever is moved to compensate for the offset relationship.

By blocking movement of the shift lever into engagement with the reverse shift rail, inadvertent shifting into reverse gear is prevented. This prevents damage or excessive wear to the transmission and shift control system thereof, and in addition and perhaps more importantly, reduces harmful engine emissions caused by the delay in completing the forward shifting sequence when the carburator is providing a rich mixture to the engine.

BRIEF DESCRIPTION OF THE DRAWING

The objects and advantages of this invention will become apparent to those skilled in the art upon careful consideration of the specification herein including the drawing wherein, FIG. 1 is a sectional view showing a typical multiple speed sliding gear manual transmission incorporating the improved shift control;

FIG. 2 is a partial sectional view taken along the line 2—2 of FIG. 1 showing details of the shift rails and collars and the associated reverse shift fork;

FIG. 3 is a partial view taken along the line 3—3 of FIG. 2 showing in detail the shift collars and associated shift rails and including the offset gates;

FIG. 4 is a shift diagram illustrating the offset relationship of the shift pattern; and FIG. 5 is a shift diagram, similar to FIG. 4, showing another offset relationship.

While this invention is susceptible of embodiment in many different forms, there is shown in the drawing, and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawing in greater detail, FIG. 1 shows a 4-speed sliding gear manual transmission 10, one of the many types of transmissions with which the invention may be associated. Transmission 10 includes a housing 12 and an input shaft 14 extending through housing 12 to define an input gear 16 within housing 12. An output shaft 18 extends through housing 12 and defines therein a support carrier on which are mounted third ratio output gear 20, second ratio output gear 22 and first-reverse ratio output gear 24.

A suitable synchronizing clutch mechanism 26 may be of the type disclosed in White et al U.S. Pat. No. 2,221,900 issued Nov. 19, 1940. A similar synchronizing clutch mechanism 28 is also carried on output shaft 18. Synchronizing clutch mechanism 28 acts as a carrier for first-reverse ratio output gear 24.

A countershaft 30 is supported for rotation within housing 12. A countershaft drive gear 32 meshes with input gear 16 for providing continuous drive to countershaft 30. Countershaft 30 also defines third ratio input gear 34 meshing with third ratio output gear 20, second ratio input gear 36 meshing with second ratio output gear 22 and first-reverse drive gear 38.

Reverse countershaft 40 is carried within housing 12. Reverse drive gears 42 and 44 are suitably carried for sliding movement along reverse countershaft 40.

Movement of synchronizing clutch mechanism 26 in the forward direction (to the left as shown in FIG. 1) will engage input gear 16 with output shaft 18 to provide direct drive. It should be understood, however, that direct drive in fourth gear is but one example of the drive relationships which may be established.

Movement of synchronizing clutch mechanism 26 in the rearward direction (to the right as shown in FIG. 1) will engage third ratio output gear 20 with output shaft 18. In this position drive is from input shaft 14 through gear 16, gear 32, gear 34, and gear 20 to output shaft 18.

Synchronizing clutch mechanism 28 is moved in the forward direction to engage second ratio output gear 22 with output shaft 18. In this position drive is from input shaft 14 through gear 16, gear 32, gear 36, and gear 22 to output shaft 18.

Synchronizing clutch mechanism 28 may be moved in the rearward direction to carry first-reverse ratio gear 24 into mesh with first-reverse drive gear 38 to establish the first drive ratio. In this position drive is from input shaft 14 through gear 16, gear 32, gear 38, and gear 24 to output shaft 18.

To establish the reverse drive ratio, reverse drive gears 42 and 44 are moved in the forward direction along reverse countershaft 40 to a position wherein gear 42 meshes with first-reverse drive gear 38. In this position gear 44 is in alignment with gear 24. A suitable meshing relationship between these two gears is then established. Reverse drive is from input shaft 14 through gear 16, gear 32, gear 38, gear 42, gear 44, and gear 24 to output shaft 18.

It should be understood that the gear drive relationships disclosed herein is by way of example, and that the shift control assembly may be incorporated in a transmission of this type or in transmissions of other types and designs.

Shift rails 46, 48 and 50 are carried within housing 12 for axial movement. Each shift rail carries a suitable shift fork for effecting gear engagement to establish the desired gear drive ratio. For example, shift fork 52 is carried by shift rail 48 and engages synchronizing clutch mechanism 26. Axial movement of shift rail 48 results in axial movement of synchronizing clutch mechanism 26 in the forward or reverse direction, as desired, to establish fourth or third gear drive ratios, respectively, as hereinabove described. A suitable shift fork 53 is carried by shift rail 46 and is in engagement with synchronizing clutch mechanism 28 for effecting axial movement thereof, along with gear 24 carried thereby. Similarly, shift fork 54 is carried by shift rail 50 for axial movement therewith. Shift fork 54 engages gear assembly 42 and 44 to slide them axially along reverse countershaft 40 upon axial movement of shift rail 50.

Shift collars 56, 58 and 60 are carried respectively by shift rails 46, 48 and 50. Collar 56 defines a gate 62 including a forward wall 64. Collar 58 defines a gate 66 including a forward wall 68. Gates 62 and 66 are in alignment, as can best be seen in FIG. 3. Collar 60 defines a gate 70 having a forward wall 72. Gate 70 is out of alignment with gates 62 and 66; that is, the axis of gate 70 is offset from the axes of gates 62 and 66. Forward wall 68 of gate 66 defines a chamfer 74 extending from forward wall 68 to a point in alignment with forward wall 72 of gate 70.

Within gate 70 of collar 60 there is a rod 76 defining a plunger 78 at one end thereof adjacent gate 66 of collar 58. A spring 80 biases plunger 78 toward gate 66. A suitable limit stop 82, at the opposite end of rod 76, prevents movement of plunger 78 beyond collar 60 and into gate 66.

A shift tower 84 is carried by housing 12 of transmission 10 and defines therein a socket 86. A shift lever 88 extends into shift tower 84 and defines a ball 90 cooperable with socket 86 to form a universal ball and socket joint. Shift lever 88 defines a lower end 92 oriented so as to be movable within and between gates 62, 66 and 70 of collars 56, 58 and 60, respectively.

Movement of shift lever 88 (horizontally as shown in FIGS. 2 and 3) will place head 92 in alignment with one of the collars 56, 58 or 60 within its respective gate 62, 66 or 70. However, while movement between gates 62 and 66 is in one plane, as these gates are in alignment, movement into gate 70 is in another, offset plane spaced from but parallel to the first plane. This results because gate 70 is offset from gates 62 and 66. This requires a slight transverse movement of shift lever 88 (vertically as shown in FIG. 3) before head 92 can be moved from gate 66 of collar 58 into gate 70 of collar 60, that is before reverse shift rail 50 can be engaged. This requirement for offset movement serves as a warning to the operator that he is preparing to engage reverse gear. In addition, resistance to entry into gate 70 is provided by spring biased plunger 78.

The advantage of this arrangement can be seen in FIGS. 4 and 5, which show diagrammatically two of the shift patterns which may be developed by this invention. When shifting, for example, from second gear to third gear, shift lever 88 would be moved upwardly, rightwardly and upwardly as shown in FIGS. 4 and 5. This would correspond to the operator moving shift lever 88 forwardly to disengage second gear, rightwardly in the neutral range to move head 92 out of gate 62 of collar 56 and into gate 66 of collar 58, and then forwardly to carry collar 58, shift rod 48 and shift fork 52 in the rearward direction (as best shown in FIG. 1) to establish the third gear ratio. By providing the offset disclosed herein, it is impossible for the operator to shift inadvertently into reverse gear, as it would be necessary for him to move shift lever 88 in the opposite direction, that is away from the third gear ratio position and toward the fourth gear ratio position, before he could move shift lever 88 to slide head 92 into gate 70 of collar 60. According to this invention, this condition would prevail regardless of the direction required for shifting of shift rail 50 to engage reverse gear.

The chamfered or beveled surface 74 of front surface 68 of gate 66 is provided to prevent blocking movement of head 92 out of groove 70 and into groove 66 when it is desired to shift out of reverse gear.

An advantage of the invention disclosed herein is that inadvertent shifting into reverse gear is prevented. An important advantage obtained thereby is a reduction in harmful engine emissions which would otherwise be caused by shift delay at a time when an operator lifts his foot to close, or partially close, the throttle and the carburetor is in a rich position.

It should be apparent that although the invention provides a novel arrangement for control of the shifting of a multiple speed, sliding gear manual transmission, it is readily convertible for use in other types of transmission assemblies with or without overdrive. Further, it should be understood that while the preferred embodiment of the invention has been shown and described, this should be considered as illustrative and may be modified by those skilled in the art without departing from the scope thereof, which is to be limited only by the claims herein.

We claim:

1. In a multiple speed ratio power transmission mechanism having gear elements selectively engagable for defining torque delivery paths between a driving member and a driven member, shift elements movable for selectively engaging said gear elements, and a shift member movable for selectively engaging and moving said shift elements, the improvement wherein said shift member is movable in a first plane into at least one engaging position and in a second plane into another engaging position, said shift elements defining gates, one of said shift elements defining a gate offset from the remainder thereof, said one shift element blocking movement of said shift member in said first plane into its gate and allowing movement of said shift member in said second plane into its gate to establish said other engaging position, another of said shift elements defining a gate having a portion thereof enlarged adjacent said offset gate, thereby facilitating movement of said shift member between said planes.

2. In a control for a multi-speed tranmission, first, second and third elements selectively movable for changing transmission output, said first and second elements respectively defining first and second gates in alignment, said third element defining a third gate out of alignment with said first and second gates, a shift member selectively movable in one path into said aligned gates for engaging one of said first and second elements and in another path into said third gate for engaging said third element, said third element blocking movement of said shift member into said third gate in said one path, said second gate having a chamfered portion adjacent said third gate for facilitating movement of said shift member between said second and third gates.

3. The invention according to claim 2, said paths being parallel and said shaft member being movable transversely between said paths.

4. The invention according to claim 3, said transverse movement being along said third element.

5. The invention according to claim 2, resilient means in said third gate tending to resist entry of said shift member thereinto.

6. The invention according to claim 2, said first element comprising a first-second ratio shift rail, said second element comprising a third-fourth ratio shift rail and said third element comprising a reverse ratio shift rail, said third gate being offset toward fourth ratio.

* * * * *